United States Patent Office 2,991,278
Patented July 4, 1961

2,991,278
COPOLYMERS OF TRIFLUOROETHYL VINYL ETHER AND HALO-OLEFINS, AND METHOD FOR PREPARING SAME

Calvin E. Schildknecht, Montclair, N.J., assignor to Air Reduction Company, Incorporated, New York, N.Y., a corporation of New York
No Drawing. Filed June 10, 1955, Ser. No. 514,791
12 Claims. (Cl. 260—87.5)

This invention relates to polymeric materials and methods of preparing same. More particularly this invention is concerned with copolymers of 2,2,2-trifluoroethyl vinyl ether and halo-olefins.

Other copolymers of 2,2,2-trifluoroethyl vinyl ether are described in my copending related applications, Serial Number 514,789, filed June 10, 1955, now Patent No. 2,851,449, and Serial Number 514,790, filed June 10, 1955.

Many homopolymeric materials, and in particular the homopolymers of halo-olefins, lack the pliability desirable in flexible films and plastics. They require, for most uses as rubbers or elastomers, the addition of other softening substances to make them more flexible or plastic. This "plasticization" has been accomplished either by the addition, after homopolymerization, of a variety of materials, referred to as external plasticizers, or by copolymerization with selected monomers, which are referred to as internal plasticizers. A number of difficulties have been encountered with external plasticization. For example, since the external plasticizer is present merely in physical admixture with the polymer, the external plasticizer is subject to migration, extraction, or oxidation from the film. The internal plasticizing monomers employed heretofore while improving the flexibility of the polymeric product have usually reduced the chemical or heat stability and/or the solvent resistance of the polymeric product. There is a need, especially in the aircraft and related fields for new synthetic rubbers or elastomers, which are resistant to organic solvents, oils, and lubricants, and which remain flexible over a wide temperature range. For example, gaskets should show a degree of rubberlike deformation and recovery, but should not be subject to solvent attack.

The primary object of this invention is the preparation of new and useful copolymers. A further object is the provision of novel copolymers which are flexible over a wide temperature range, readily formed into films or molded shapes, are chemically heat-stable, and possess outstanding solvent resistance. Another object is the preparation of valuable copolymers of 2,2,2-trifluoroethyl vinyl ether and a halo-olefin. A still further object of this invention is to provide a commercially feasible process for obtaining copolymers of 2,2,2-trifluoroethyl vinyl ether. Other objects will in part be obvious from, and will in part appear in, the following detailed description.

In accordance with the present invention, these objects are obtained by copolymerizing 2,2,2-trifluoroethyl vinyl ether with a copolymerizable halogen-substituted, terminally unsaturated, lower olefin wherein the halogen atoms are selected from the group consisting of fluorine and chlorine atoms. Examples of halo-olefins which are suitable in the practice of this invention include: vinyl chloride, vinylidene chloride, vinylidene fluoride, trifluorochloroethylene, tetrafluoroethylene, perfluorobutadiene and other fluorodienes, hexafluoropropene, perfluoroisobutylene, chloroprene, chloroisoprene, and fluoroprene. This list is merely illustrative. Other halo-olefins which may be suitable will readily occur to those skilled in the art to which this invention pertains.

The monomer, 2,2,2-trifluoroethyl vinyl ether (herein sometimes referred to simply as trifluoroethyl vinyl ether), can be represented by the following formula:

$$F_3C—CH_2—O—CH=CH_2$$

In general, 2,2,2-trifluoroethyl vinyl ether can be prepared by vinylation of 2,2,2-trifluoroethanol with acetylene in the presence of the corresponding alkali metal alcoholate, for example, potassium 2,2,2-trifluoroethanolate. A more detailed description may be found in the copending applications of Julius G. Shukys, Serial Number 290,582, filed May 28, 1952, now abandoned, and Serial Number 357,901, filed May 27, 1953, now Patent No. 2,830,007. It has been found advantageous to use a purified trifluoroethyl vinyl ether in copolymerizations. By the term "purified" trifluoroethyl vinyl ether is meant trifluoroethyl vinyl ether substantially free from alcohol, acetylene, aldehyde, or other polymerization inhibiting materials. The trifluoroethyl vinyl ether may be purified by subjecting it to an acid wash with a mineral acid followed by fractional distillation, as more fully described in Shukys' application Serial Number 357,901.

The homopolymerization of 2,2,2-trifluoroethyl vinyl ether has been described in applicant's copending application, Serial Number 409,057, filed on February 8, 1954, now Patent No. 2,820,025, of which this application is a continuation-in-part. This compound homopolymerizes to form a high molecular weight, rubberlike, form-stable, non-tacky product only with great difficulty. As more fully described in the aforementioned application, such homopolymers are obtained by cationic polymerizations in the presence of certain activating chlorinated solvents at low temperatures. Entirely unexpectedly, it has now been found that copolymers of 2,2,2-trifluoroethyl vinyl ether and halo-olefins can be prepared smoothly and rapidly, under certain conditions, by free-radical means.

The copolymerizations of 2,2,2-trifluoroethyl vinyl ether with a halo-olefin copolymerizable monomer may be carried out in bulk, solution, suspension, or emulsion in the presence of a free-radical supplying initiator. The free-radical supplying initiators used in the practice of this invention may be a peroxygen, persulphate or azo compound. The useful peroxygen compounds include the organic peroxides, such as dibenzoyl peroxide, benzoyl acetyl peroxide, dilauroyl peroxide, diacetyl peroxide, dipropionyl peroxide, benzoyl peroxide and lauroyl peroxide; dialkyl peroxides, such as diethyl peroxide and dipropyl peroxide; organic hydroperoxides, such as tert.-butyl hydroperoxide; inorganic peroxides, such as hydrogen peroxide and alkaline-earth metal peroxides. Suitable persulphate initiators include the sodium, potassium, calcium, barium, and ammonium salts of persulphuric acid. Useful azo compound initiators include azo-bis-isobutyronitrile and 1-azo-bis-1-phenylethylene. The free-radical supplying initiator should be employed in an amount of 0.001% to 5% by weight of the combined weight of the monomers and preferably there is employed between 0.01% and 1% by weight of the combined weight of the monomers. The exact quantity of initiator will depend upon the particular monomers and the initiator being employed.

Excess quantities of oxygen should be eliminated from the reaction sphere. This may be accomplished by purging the reaction vessel prior to polymerization with an inert gas, such as nitrogen, carbon dioxide, the rare gases, such as argon, or mixtures thereof; and conducting the reaction in a substantially inert atmosphere, e.g. in an atmosphere of an inert gas or in a vacuum.

The copolymerizations when carried out in a non-solvent for the monomers, such as water, may be dispersed therein by using surface-active agents. Such surface-active agents may include anionic agents such as the alkali metal sulfates and sulfonates, including sodium lauryl sulfate, the sodium salt of the sulphonic acid of dioctyl succinic ester (Aerosol O.T.), alkyl aryl sulphonates, such as dodecyl benzene sulfonate (Santomerse), and the like. Hydrophilic colloids such as gum arabic, completely or partially hydrolyzed polyvinyl alcohol, gelatin, gum tragacanth, hydroxyethyl cellulose ("Cellosize"), carboxymethyl cellulose, etc., may be used in conjunction with or in place of the surface-active agent.

Activating agents may be used in combination with the free-radial supplying initiator. Such activators include water-soluble reducing agents, such as sodium bisulfite, sodium hydrosulfite, ferrous compounds, and sulfoxylates, such as sodium or zinc formaldehyde sulfoxylates. Other activators which can be used are the amine-type activators, such as triethanolamine, dimethyl aniline or triethylene tetramine. These activators normally are employed in concentrations equal to or lesser than the concentration of the free-radical supplying initiator employed.

The temperatures and pressures used for the copolymerization will depend, in part, upon the nature of the monomer to be copolymerized with trifluoroethyl vinyl ether, and the molecular weight of the copolymer desired. The temperature may vary between 0° C. to 100° C., although temperatures of from 40–70° C. are preferred. Usually, elevated pressures are not necessary, although pressures as high as 700 atmospheres may be used especially in copolymerization with fluoroolefins, such as tetrafluoroethylene.

The time of copolymerization will depend upon a variety of considerations including such factors as the comonomer used, the temperature of the copolymerization, and the amount and type of the free-radical supplying initiator and accelerator used. Generally, the copolymerization time is between about 1–50 hours, and usually between about 2–20 hours.

The copolymers of this invention can contain variable amounts of each comonomer. For example, the copolymers can contain 5 to 95% by weight of trifluoroethyl vinyl ether and from 95 to 5% by weight of the haloolefin copolymerizable monomer. However, those copolymers containing from 5 to 50% by weight trifluoroethyl vinyl ether units are preferred for technological as well as economic reasons. Technologically, favorable reaction rates and copolmers of high viscosity, good chemical stability, and free from discoloration can be obtained with less than equal molar proportions of trifluoroethyl vinyl ether. It has also been found that the molar proportion of trifluoroethyl vinyl ether entering the copolymer is lower than that in the mixture of monomers. This fact is favorable for the production of homogeneous products containing a minor proportion of trifluoroethyl vinyl ether units as internal plasticizer. Any unreacted trifluoroethyl vinyl ether can be readily recovered. Furthermore, advantageous rates of reaction are obtained when the molar proportions of trifluoroethyl vinyl ether in the copolymer are minor.

The copolymers of this invention unexpectedly possess high intrinsic viscosities or molecular weights. This is particularly surprising since the non-trifluoromethyl-containing alkyl vinyl ethers in copolymerization with most olefinic monomers depress greatly the degree of polymerization and intrinsic viscosity of copolymers formed. Furthermore, trifluoroethyl vinyl ether is surprisingly stable to hydrolysis even in aqueous acid conditions, whereas the non-trifluoromethyl-containing alkyl vinyl ethers hydrolyze too quickly to permit satisfactory copolymerization. The stability of trifluoroethyl vinyl ether to hydrolysis is particularly important since acid conditions often are desirable, for example, in aqueous emulsion, in order to give more stable copolymer latices. Further, copolymerization of trifluoroethyl vinyl ether can also be carried out with acidic or acid-producing comonomers. For example, many halogen-containing monomers liberate some free-acid during aqueous polymerizations. In addition, the stability of trifluoroethyl vinyl ether to hydrolysis permits recovery of any unreacted ether even when the reactions are carried out in an aqueous medium. Trifluoroethyl vinyl ether has another advantage as a comonomer. Since trifluoroethyl vinyl ether does not homopolymerize by free-radical methods, the copolymers obtained therefrom are more homogeneous. Still greater homogeneity of the copolymers can be obtained by portionwise, increment or continuous addition of the vinyl ether during the copolymerization reaction.

The copolymer rubbers prepared in accordance with this invention may be cured or vulcanized by conventional methods such as used with polymers of butadiene and chloroprene. For example, treatment of the copolymer with sulfur, sulfur-containing compounds, or magnesium or zinc oxides may result in crosslinking of the copolymer. The properties of the copolymer may also be modified by incorporating a small proportion, e.g. less than 10%, of a bifunctional monomer into the reaction mixture, and conducting the copolymerization under conditions designed to give fusible partial copolymers containing residual reactive double bonds. Such bifunctional monomers include vinyl acrylate, allyl methacrylate, diallyl maleate, diallyl benzene phosphonate, triallyl cyanurate, trimethallyl phosphite and their fluorine derivatives. Conjugated dienes are not considered as belonging to this group. The various techniques for modifying the properties of copolymer and polymer products are well known to the art.

The following examples will serve to illustrate more clearly the preparation of the novel copolymers of this invention. It is to be understood that these examples are not to be considered limitative of the scope of the invention. The parts given are parts by weight.

EXAMPLE I

*Copolymers of 2,2,2-trifluoroethyl vinyl ether and tetrafluoroethylene*

A high pressure reactor is flushed with nitrogen and charged with 200 parts of deoxygenated water, 0.15 part ammonium persulfate, and 1.0 part of sodium pyrophosphate. The reactor is closed, evacuated and cooled to −78° C. Then, the reactor is charged with 10 parts 2,2,2-trifluoroethyl vinyl ether and 60 parts tetrafluoroethylene. The reaction mixture is agitated at 55–65° C. for 15 hours at a pressure of 300 to 500 atmospheres. The copolymer formed is washed with water and dried. The product is characterized by less opacity and greater plasticity on heating than shown by tetrafluoroethylene homopolymers.

EXAMPLE II

*Copolymers of 2,2,2-trifluoroethyl vinyl ether and vinyl chloride*

A pressure reaction vessel was charged with a mixture of:

| | |
|---|---|
| Water _____g__ | 100 |
| Ammonium persulfate _____g__ | 2.0 |
| Sodium bisulfite _____g__ | 1.0 |
| Sodium lauryl sulfate _____g__ | 1.0 |
| Formic acid _____drops__ | 12 |

The vessel was then swept with nitrogen and then with carbon dioxide to remove oxygen. The aqueous phase was then cooled until frozen and a mixture of 37.6 g. of vinyl chloride and 12.6 g. of 2,2,2-trifluoroethyl vinyl ether was added. The temperature was raised to 40–50° C. The batch was maintained within that temperature range for 2.5 hours. After that time, a copolymer latex had formed. The latex was coagulated by freezing with Dry-Ice, and then allowed to thaw slowly. A solution of 4 g. of urea in 174 g. of methanol is stirred into the copolymer slurry and it was allowed to stand for ½ hour.

The batch was then filtered and washed with methanol containing 1% of urea. The copolymer mass was voluminous, granular, and white. The copolymer was dried in vacuum at a temperature of 50° C. Yield: 33.0 g.; conversion to copolymer 66%. Analysis showed 3.7 percent F. in the copolymer or 8.2% by weight of combined trifluoroethyl vinyl ether. There was 14.3 mol percent of trifluoroethyl vinyl ether in the monomer mixture, and there was 4.3 mol percent of trifluoroethyl vinyl ether combined in the copolymer.

The copolymer products of this invention are adapted to a variety of uses. They can be fabricated, as by molding or extrusion, into various shaped articles, such as films, foils, tapes, tubing, etc. They are especially useful as gaskets, and can generally be employed where flexible, chemically heat stable, and solvent resistant rubbers are desirable. The copolymers may be applied by coating and the like to wires to provide water and corrosion resistant impervious coatings. It may be desirable for certain applications to incorporate various plasticizers, fillers, stabilizers, pigments, or other resins into the copolymer compositions.

It is to be understood that many variations can be made without departing from the scope of this invention. The invention is not to be limited except as defined in the appended claims.

What is claimed is:

1. A binary copolymer containing from 5 to 50 percent by weight of said copolymer of 2,2,2-trifluoroethyl vinyl ether and from 95 to 50 percent by weight of said copolymer of a halogen-substituted, terminally unsaturated, lower olefin wherein the halogen atoms are selected from the group consisting of fluorine and chlorine atoms.

2. A copolymer as defined in claim 1, wherein said lower olefin is tetrafluoroethylene.

3. A copolymer as defined in claim 1, wherein said lower olefin is vinyl chloride.

4. A copolymer as defined in claim 1, wherein said lower olefin is trifluorochloroethylene.

5. A process for preparing binary copolymers of 2,2,2-trifluoroethyl vinyl ether and a halogen-substituted, terminally unsaturated, lower olefin wherein the halogen atoms are selected from the group consisting of fluorine and chlorine atoms, which comprises reacting a monomer mixture consisting of the said monomers wherein said ether is in an amount of from 5 to 95 percent by weight of the combined monomer weight with said lower olefin in an amount of from 95 to 5 percent by weight of the combined monomer weight in the presence of a free-radical supplying copolymerization initiator.

6. A process as defined in claim 5, wherein the copolymerization temperature is in a range of from about 0° C. to about 100° C.

7. A process as defined in claim 5, wherein said lower olefin is tetrafluoroethylene.

8. A process as defined in claim 5, wherein said lower olefin is trifluorochloroethylene.

9. A process as defined in claim 5, wherein said lower olefin is vinyl chloride.

10. A process of preparing binary copolymers of 2,2,2-trifluoroethyl vinyl ether and a halogen-substituted, terminally unsaturated, lower olefin wherein the halogen atoms are selected from the group consisting of fluorine and chlorine atoms, which comprises dispersing a monomer mixture consisting of the said monomers, wherein said ether is in an amount of from 5 to 50 percent by weight of the combined monomer weight and said lower olefin is in an amount of from 95 to 50 percent by weight of the combined monomer weight in an aqueous medium, and reacting said monomers in the presence of a free-radical supplying copolymerization initiator at a temperature of from about 0° C. to about 100° C., and recovering the unreacted 2,2,2-trifluoroethyl vinyl ether.

11. A binary copolymer containing from 5 to 95 percent by weight of said copolymer of 2,2,2-trifluoroethyl vinyl ether and from 95 to 5 percent by weight of said copolymer of a halogen-substituted, terminally unsaturated lower olefin wherein the halogen atoms are selected from the group consisting of fluorine and chlorine atoms.

12. A copolymer containing from about 5 to 50 percent by weight of said copolymer of 2,2,2-trifluoroethyl vinyl ether and from about 95 to 50 percent by weight of said copolymer of perfluorobutadiene.

References Cited in the file of this patent

UNITED STATES PATENTS

| | | |
|---|---|---|
| 2,016,490 | Fikentscher | Oct. 8, 1935 |
| 2,559,752 | Berry | July 10, 1951 |
| 2,631,975 | Lawson | March 17, 1953 |
| 2,682,527 | Dickey et al. | June 29, 1954 |